United States Patent
Poulin

(10) Patent No.: US 10,000,336 B2
(45) Date of Patent: Jun. 19, 2018

(54) AUTOMATED RACK UNLOADING APPARATUS

(71) Applicant: ZOETIS CANADA INC., Kirkland (CA)

(72) Inventor: Patrick Poulin, London (CA)

(73) Assignee: ZOETIS CANADA INC., Kirkland, Quebec ( * ) Notice: Subject to any disclaimer, the term of this patent is extended or adjusted under 35 U.S.C. 154(b) by 35 days.

(21) Appl. No.: 14/848,601

(22) Filed: Sep. 9, 2015

(65) Prior Publication Data
US 2016/0075511 A1    Mar. 17, 2016

Related U.S. Application Data

(60) Provisional application No. 62/058,325, filed on Oct. 1, 2014, provisional application No. 62/049,043, filed on Sep. 11, 2014.

(51) Int. Cl.
*B65G 1/04* (2006.01)
*B66F 9/12* (2006.01)

(52) U.S. Cl.
CPC ............ *B65G 1/0435* (2013.01); *B66F 9/122* (2013.01)

(58) Field of Classification Search
CPC ......... B65G 1/0435; B66F 9/122; B66F 9/195
USPC ............ 198/370.07, 371.2; 414/280, 416.04, 414/514, 521
See application file for complete search history.

(56) References Cited

U.S. PATENT DOCUMENTS

| | | | |
|---|---|---|---|
| 3,572,563 A * | 3/1971 | Oliver | B60P 1/52 414/514 |
| 3,750,804 A | 8/1973 | Lemelson | |
| 4,203,696 A * | 5/1980 | Lindberg | B65G 65/00 414/277 |
| 4,283,164 A * | 8/1981 | Reaney | B60K 1/04 414/515 |

(Continued)

FOREIGN PATENT DOCUMENTS

| | | |
|---|---|---|
| DE | 3840748 A1 | 6/1990 |
| JP | 51116579 | 10/1976 |

(Continued)

OTHER PUBLICATIONS

PCT International Search Report and Written Opinion, International Filing Date Sep. 8, 2015; International Application No. PCT/US2015/048809.

*Primary Examiner* — James Keenan
(74) *Attorney, Agent, or Firm* — Scott C. Mayhew

(57) ABSTRACT

An automated rack unloading apparatus for automatically unloading a container from a rack shelf is provided. Such an apparatus includes a frame and a carriage assembly operably engaged with the frame. The carriage assembly travels vertically to align with a rack shelf on which a container to be unloaded from the rack shelf is located. The carriage assembly has a first end and a second end. A spoon is pivotally connected to the first end of the carriage assembly at a pivot point. A retractable support mechanism supports the second end of the carriage assembly. The retractable support mechanism is operable to lower a leading edge of the spoon with reference to the pivot point to thereby downwardly incline the spoon for insertion under the container. An associated method is also provided.

1 Claim, 2 Drawing Sheets

(56) References Cited

U.S. PATENT DOCUMENTS

| | | | | |
|---|---|---|---|---|
| 5,380,139 | A | * | 1/1995 | Pohjonen ............. B65G 1/0435 414/273 |
| 5,589,113 | A | * | 12/1996 | Frye ...................... B60R 21/237 264/295 |
| 5,934,195 | A | * | 8/1999 | Rinke ................. G03F 7/70383 101/401.1 |
| 6,267,550 | B1 | * | 7/2001 | Morgan ................. B65G 15/14 198/419.1 |
| 6,883,258 | B2 | * | 4/2005 | McCabe ................ D06F 67/04 38/143 |
| 8,465,243 | B2 | * | 6/2013 | van Ooyen .......... B65G 1/0435 414/281 |
| 8,764,367 | B2 | * | 7/2014 | McCabe ................ D06F 95/00 198/468.01 |
| 2006/0285947 | A1 | * | 12/2006 | Hansl ................... B65G 1/0407 414/277 |
| 2013/0078064 | A1 | | 3/2013 | Kostmann et al. |

FOREIGN PATENT DOCUMENTS

| | | | |
|---|---|---|---|
| JP | 5244984 | 4/1977 | |
| JP | 2004131266 | 4/2004 | |
| SU | 1180313 A1 | 9/1985 | |
| WO | WO 00/58189 A2 * | 10/2000 | ........... B65G 1/0435 |

\* cited by examiner

AUTOMATED RACK UNLOADING APPARATUS

CROSS REFERENCE TO RELATED APPLICATIONS

This application claims the benefit of U.S. Provisional Patent Application Nos. 62/049,043, filed Sep. 11, 2014, and 62/058,325, filed Oct. 1, 2014, both of which are expressly incorporated herein by reference in their entirety.

TECHNICAL FIELD

The present disclosure generally relates to automation in the field of unloading containers stored on rack shelves.

BACKGROUND

Many different industrial operations require unloading containers from shelved racking. Typically, containers with goods are loaded on wheeled racks for transport to a location in the plant where further processing of the goods is to take place. Each rack shelf may support a single container or multiple containers. For example, in broiler hatchery operations, eggs are typically stored in multiple containers on each shelf, called multi-piece flats, for storage and handling. Operationally, a container must be unloaded from the rack and moved or transported to an operational piece of equipment, such as a conveyor for further downstream processing in the plant facility.

In these and other operations, the distance between shelves is typically small and leaving minimal clearance between the goods in each container and the shelf above. The spacing and configuration of the shelves on these racks is not standardized and can vary rack-to-rack, even within the operations at a single facility. This creates a challenge for automation because the rack unloading apparatus must be able to effectively remove containers from variously configured racks.

Known automated rack unloading systems and apparatus remove containers from the racks by hooking the edge of the container and pulling it off the shelf. This approach is only practical where a single container is stored on each shelf. In the case where multiple containers are stored on each shelf, each container on the shelf would have to be individually hooked and removed which increases the time required to unload each rack. It would be preferable to simultaneously remove multiple containers from each shelf in a single operation.

Other known automated rack unloading systems for multi-piece containers or flats insert a "spoon" under the container(s) to thereby load the container(s) on the spoon. The spoon and the container(s) are withdrawn thereby unloading the rack shelf. This requires that the leading edge of the spoon be referenced and guided to a pre-programmed position on the shelf which is the contact point between the bottom of the container(s) and shelf surface so as to be insertable thereunder. Programming this position is unreliable given the variation in rack design, shelf pitch and flat designs.

Accordingly, there is a need for an automated rack unloading apparatus that is able to meet these objects and reliably maintain the high unloading processing rates demanded of automated equipment in modern operations. Furthermore, it would be desirable to provide an associated method.

BRIEF SUMMARY

The above and other needs are met by aspects of the present disclosure which, according to one aspect, provides an automated rack unloading apparatus. The apparatus includes a frame and a carriage assembly operably engaged with the frame. The carriage assembly is configured to travel vertically to align with a rack shelf on which a container to be unloaded from the rack shelf is located. The carriage assembly has a first end and a second end. A spoon assembly is pivotally connected to the first end of the carriage assembly at a pivot point. A retractable support mechanism is configured to support the second end of the carriage assembly. The retractable support mechanism is operable to lower a leading edge of the spoon with reference to the pivot point to thereby downwardly incline the spoon for insertion under the container.

Another aspect provides a method of unloading containers stored on rack shelves. The method comprises positioning an automated rack unloading apparatus adjacent to a rack shelf having a container to be unloaded therefrom. The method further comprises vertically positioning a carriage assembly of the automated rack unloading apparatus proximate to the rack shelf. The method further comprises extending a spoon of the carriage assembly such that a leading edge of the spoon is positioned overlying the rack shelf. The method further comprises lowering the leading edge of the spoon in an inclined position to engage the rack shelf. The method further comprises extending the spoon to slide along the rack shelf and underneath the container. The method further comprises retracting the spoon to remove the container from the rack shelf.

Thus, various aspects of the present disclosure provide advantages, as otherwise detailed herein.

BRIEF DESCRIPTION OF THE DRAWINGS

Figure 1:
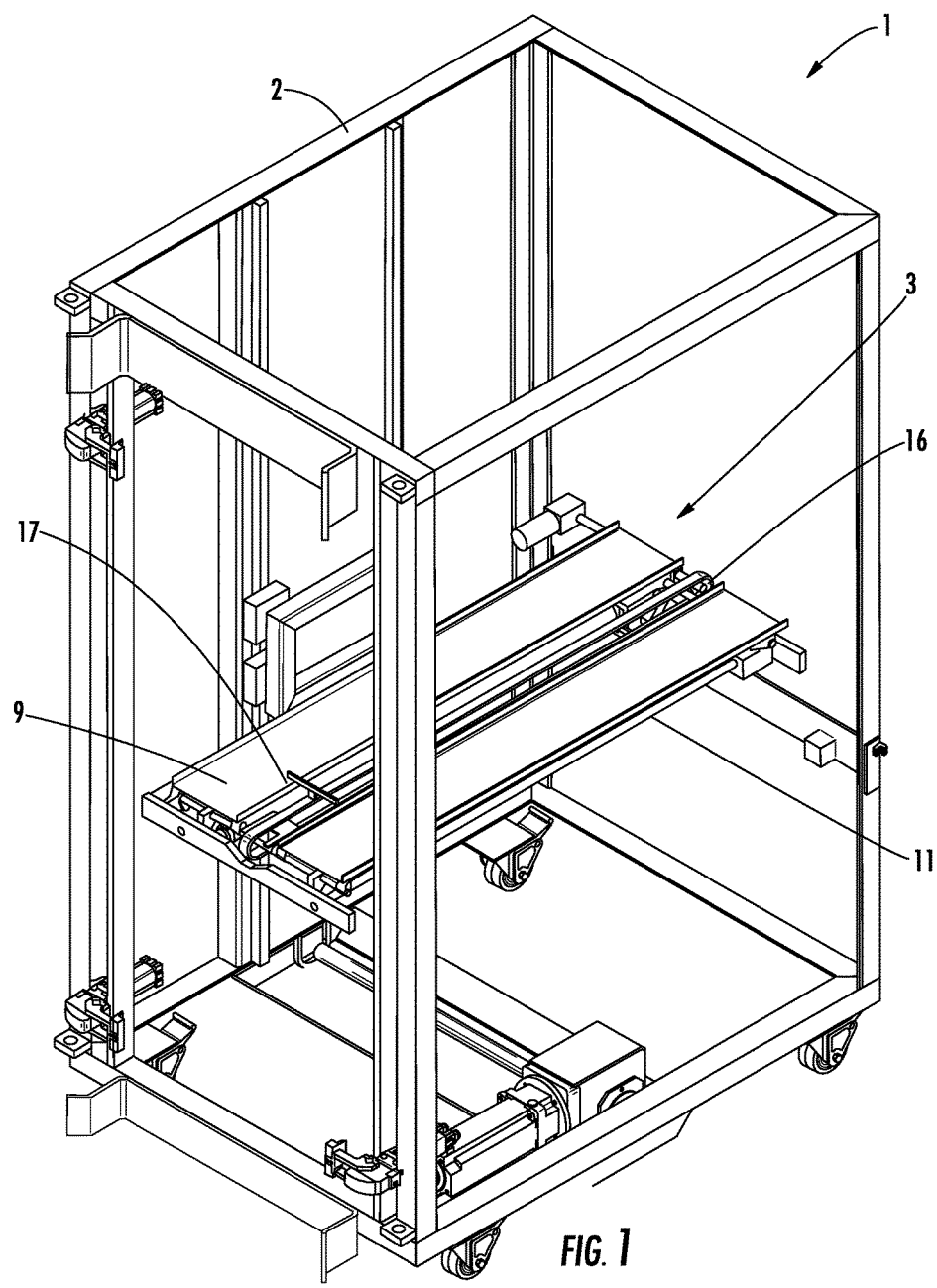
Figure 2:
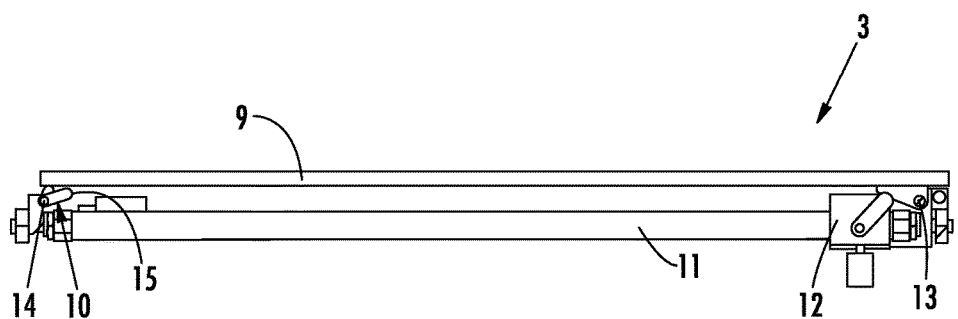
Figure 3:
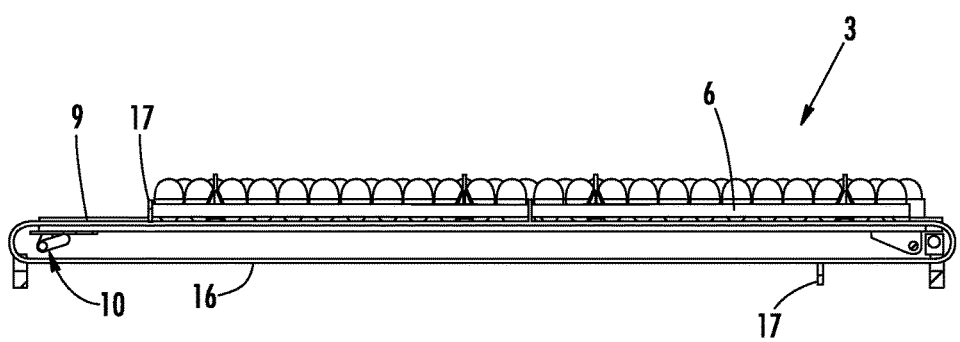

Having thus described various embodiments of the present disclosure in general terms, reference will now be made to the accompanying drawings, which are not necessarily drawn to scale, and wherein:

FIG. 1 is a perspective drawing of a rack unloading apparatus, according to one aspect of the present disclosure, with side walls removed to show the internal elements of the apparatus;

FIG. 2 is a sectional side view of an unloading carriage assembly shown in FIG. 1, illustrating the details of a spoon mechanism and retractable support mechanism; and FIG. 3 is a sectional side view of a carriage assembly shown in FIG. 1, illustrating the details of a discharge conveyor mechanism.

DETAILED DESCRIPTION OF THE DISCLOSURE

Various aspects of the present disclosure now will be described more fully hereinafter with reference to the accompanying drawings, in which some, but not all aspects of the disclosure are shown. Indeed, this disclosure may be embodied in many different forms and should not be construed as limited to the aspects set forth herein; rather, these aspects are provided so that this disclosure will satisfy applicable legal requirements. Like numbers refer to like elements throughout.

The present disclosure discloses an automated rack unloading apparatus capable of being positioned or otherwise located adjacent a rack to be unloaded. The apparatus may include a carriage assembly, which travels vertically to align with a rack shelf on which a container that is to be unloaded from the rack is located. A spoon on the carriage assembly may be pivotally connected at one end and may be supported at the other end by a retractable support mechanism that is operable to lower a leading edge of the spoon with reference to a pivot point to thereby downwardly incline the spoon for insertion under the container.

As used in the following description, "container" refers to any tray, flat, bin, box, or the like used to store or transport goods, articles, materials, or other like things. Although the description refers to a single container on each shelf, multiple containers on the same shelf may be simultaneously removed by the automated rack unloading apparatus, according to the present disclosure.

According to one aspect of the present disclosure, an automated rack unloading apparatus 1 is shown in FIG. 1. The apparatus 1 may have a box-like frame, or cabinet 2, having a carriage assembly 3 mounted on rails, which is adapted to move vertically up and down within the cabinet 2. Any suitable vertical positioning mechanism may be used to position the carriage assembly 3, such as, for example a one-axis rail-type system, mounted within the cabinet 2 and engaged with the carriage assembly 3 and its positioning mechanism are controlled by any suitable robotic control system, such as a servo drive. The cabinet 2 may be open on all sides, as shown in FIG. 1, or closed in which case door access is provided.

The carriage assembly 3 may have a flat elongated sheet-like device called a spoon 9 that is mounted within the carriage assembly 3 and adapted, in a first sequence, to slide out of the cabinet 2 in a forward direction for insertion underneath a container 6 and then slide back into the cabinet 2 in a rearward direction to thereby retrieve the container 6 from a rack. In a second sequence, a belt discharge mechanism may egress the container 6 from the cabinet 2 in the rearward direction to deposit the container 6 on an adjacent surface such as a conveyor belt. Between the first and second sequences described above, the carriage assembly 3 moves vertically, as required, to reconcile the height of the shelf being unloaded on one side of the cabinet 2 and the adjacent conveyor surface on the other. Although a single spoon 9 will be referred to in the following description, two, three or more spoons 9 may be arranged side-by-side on the carriage assembly 3, as shown in FIG. 1. Other spoon configurations are possible, such as vertically spaced, with the object being to provide a good balance of throughput and flexibility to accommodate racks with different shelf configurations and plant process requirements.

The spoon 9 may have a front leading edge and a pivotal attachment at the back edge. In the normal or start position, the spoon is in the horizontal position. The leading edge of the spoon may be free to move downwardly with reference to the pivot point and is supported underneath by a retractable support mechanism which, in one aspect, is a cam 10. The cam 10 may be operable to rotate and lower the leading edge of the spoon 9 to orient the spoon 9 in a downwardly inclined position or raise the leading edge of the spoon 9 to return the spoon 9 to the horizontal position. Normally, the cam 10 may support the spoon 9 in the horizontal position, when the spoon 9 is supported on the nose 15 of the cam 10. Rotation of the cam 10 may lower the leading edge of the spoon 9 and inclines the spoon 9 downwardly. The cam 10 may be an elongated or irregularly shaped disc cam.

In one aspect, the retractable support mechanism which lowers and/or raises the leading edge of the spoon may be a cam. Any other suitable retractable device may be used such as a direct air cylinder, solenoid lever arrangement or air bladder. The purpose and function of the retractable support mechanism is to transfer the support point for the leading edge of the spoon 9 to the top surface of the rack shelf and use the rack shelf surface as a fixed external reference to reliably guide the leading edge of the spoon 9 to an optimal insertion point between the container and shelf surface. As a result, the spoon 9 may be inserted under the container to load the container.

In some instances, the spoon 9 may also be slidably mounted within the carriage assembly 3, preferably by engaging the pivoting end of the spoon 9 with a pneumatic rodless cylinder 11, attached to the carriage assembly 3. Pneumatic rodless cylinders may have an external carriage assembly connected to an internal piston, which both move together along the length of the cylinder, in response to the pneumatic pressure within the cylinder. The spoon 9 may be pivotally attached to the rodless cylinder 11 by means of a pin, and may slide forward and rearward in response to actuation of the rodless cylinder 11.

As shown in FIG. 2, the spoon 9 may be pivotally mounted to the carriage assembly 3 such as at carriage member 12 of the rodless cylinder 11 at a pivot or attachment point 13 that is above the height of the rotational center 14 of the cam 10. The attachment point 13 may be aligned with the highest point on the retractable support mechanism. When the spoon 9 is in the horizontal position, the nose 15, or the highest point of the cam 10 may support the leading edge of the spoon 9 at the point of maximum lift. Rotating the cam 10 may move the nose 15 out of the engagement with the underside of the spoon 9 and the spoon 9 follows the cam 10 surface downwardly and is thereby lowered. As a result, the spoon 9 may be level or horizontal when the cam 10 is fully extended and inclined downwardly when the cam 10 is rotated out of the fully extended position.

As shown in FIG. 3, an endless belt-type discharge conveyor 16 may be mounted longitudinally on the carriage assembly 3, adjacent to the spoon 9. The discharge conveyor 16 may have a flight 17, or paddle, extending therefrom and positioned to engage with an edge of the container 6 to push the container 6 in the rearward direction off the end of the spoon 9, as further described below.

In operation, the rack unloading process may begin with removing a container 6 from a shelf on a rack (not shown). First, the carriage assembly 3 may be vertically positioned, within the cabinet 2, at each shelf so that the spoon 9 is slightly above the rack shelf height. The spoon 9 may then be extended a distance outwardly such that the free end of the spoon 9 is positioned overlying the edge of the shelf. The cam 10 may be then rotated to lower the spoon 9 into the inclined position, and may engage the leading edge of the spoon 9 with the surface of the shelf. The lowering of the leading edge of the spoon 9 may transfer the spoon support point from the retractable support mechanism to the shelf surface. The rodless cylinder 11 may be then actuated, thereby extending the spoon 9 outwardly in the forward direction to slide along the surface of the shelf and underneath the container 6. As the spoon 9 slides along the shelf, the container 6 may be lifted off of the shelf and supported by the spoon 9. The rodless cylinder 11 may be again actuated to retract the spoon 9 in the rearward direction, within the cabinet 2, bringing the container 6 with it. Once the spoon 9 is refracted, the cam 10 may be rotated to engage the nose 15 of the cam 10 with the underside of the spoon 9 and raise the spoon to the horizontal position, thereby transferring the spoon support from the top surface of the shelf of the retractable support mechanism, so that the spoon 9 and the container 6 are level within the cabinet 2.

The next step in the process may be to discharge the container 6 from the apparatus 1. In one instance, the container 6 may be egressed onto a receiving conveyor (not shown), which is located adjacent to the cabinet 2 on the side opposite the rack. First, the carriage assembly 3 may be vertically positioned adjacent to the receiving conveyor, such that the container 6 is positioned at or just above the top surface of the receiving conveyor. The discharge conveyor 16 may then rotate to bring the flight 17 into contact with the forward edge of the container 6. The discharge conveyor 16 may continue to rotate, thereby pushing the container 6 off the spoon 9, out of the cabinet 2 in the rearward direction, and onto the receiving conveyor. The process may repeat until the rack has been completely unloaded.

The tight spacing of the shelves on most racks means the apparatus 1 may be operated within very narrow tolerances. Supporting the free end of the spoon 9 on the shelf may allow the spoon 9 to slide reliably under the container 6, along the surface of the shelf, and lift the container 6 just high enough to remove it from the rack, without damaging the contents of the container 6 on the underside of the shelf above.

The spoon 9 may, optionally, be provided with an end clip, or tailgate (not shown), at the free end of the spoon 9, which moves between a flat position and an upright position. When in the flat position, the tailgate may extend from the free end of the spoon 9, in the same plane as the spoon 9. When in the upright position, the tailgate may extend vertically, perpendicular to the plane of the spoon 9. During operation, the tailgate may be kept in the flat position until the spoon 9 has been fully inserted into the shelf, below the container 6. The tailgate may then be moved into the upright position, for example by a cable mechanism, so as to prevent the container 6 from sliding off the spoon 9 as it is retracted into the cabinet 2.

The use of the apparatus 1, according to the present disclosure, may allow an operator to pre-program a rack unloading cycle for a variety of different configurations of racks and simply select the appropriate cycle to unload each type of rack before the apparatus 1 begins the unloading operation. The freely pivoting capability of the spoon 9 provides vertical compliance that reduces damage to the contents of containers 6, during a rack unloading operation.

Many modifications and other aspects of the present disclosure set forth herein will come to mind to one skilled in the art to which this disclosure pertains having the benefit of the teachings presented in the foregoing descriptions and the associated drawings. Therefore, it is to be understood that the present disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. An automated rack unloading apparatus, comprising:
    a frame; and
    a carriage assembly operably engaged with the frame and configured to travel vertically to align with a plurality of rack shelves on which a plurality of containers to be unloaded from the rack shelves are located, the carriage assembly comprising:
        a pair of spoons positioned side-by-side, each spoon being slidably mounted within the carriage assembly so as to be capable of extending out onto the rack shelf, each spoon having a first end and a second end;
        a pair of pneumatic rodless cylinders, each pneumatic rodless cylinder being configured to be actuated for extending and retracting a respective spoon, each pneumatic rodless cylinder having a carriage member at which the first end of the respective spoon is pivotally mounted at a pivot point;
        a pair of retractable support mechanisms, each retractable support mechanism being configured to support the second end of the respective spoon, each retractable support mechanism being operable to lower a leading edge of the spoon with reference to the pivot point to thereby downwardly incline the spoon for insertion under the container; and
        a discharge conveyor disposed between the pair of spoons, the discharge conveyor being configured to simultaneously egress the containers on the respective spoons from the carriage assembly.

\* \* \* \* \*